United States Patent
Fostiropoulos

(10) Patent No.: US 12,493,630 B2
(45) Date of Patent: Dec. 9, 2025

(54) DECENTRALIZED DATABASE, METHOD FOR MAINTAINING SAME, AND CONFERENCING APPLICATION BASED THEREON

(71) Applicant: alfaview Video Conferencing Systems GmbH & Co. KG, Karlsruhe (DE)

(72) Inventor: Nikolaos Fostiropoulos, Karlsruhe (DE)

(73) Assignee: alfaview Video Conferencing Systems Gmbh & Co. KG, Karlsruhe (DE)

( * ) Notice: Subject to any disclaimer, the term of this patent is extended or adjusted under 35 U.S.C. 154(b) by 41 days.

(21) Appl. No.: 18/425,044

(22) Filed: Jan. 29, 2024

(65) Prior Publication Data
US 2024/0256565 A1 Aug. 1, 2024

(30) Foreign Application Priority Data
Jan. 31, 2023 (DE) .......................... 102023102250.4

(51) Int. Cl.
G06F 16/27 (2019.01)
H04N 7/15 (2006.01)

(52) U.S. Cl.
CPC ............ *G06F 16/27* (2019.01); *G06F 16/275* (2019.01); *H04N 7/15* (2013.01)

(58) Field of Classification Search
CPC ................................................ G06F 16/27–275
See application file for complete search history.

(56) References Cited

U.S. PATENT DOCUMENTS

| 7,801,861 B2 * | 9/2010 | Wong ...................... G06F 16/27 |
| | | 707/645 |
| 9,971,826 B1 * | 5/2018 | Belmar ................... G06F 16/27 |

(Continued)

FOREIGN PATENT DOCUMENTS

| DE | 102009014409 A1 * | 1/2010 | ............. G03B 17/48 |
| WO | WO-2005024596 A2 * | 3/2005 | ............. G06F 16/00 |
| WO | 2017181086 A1 | 10/2017 | |

OTHER PUBLICATIONS

M. Amad: "A scalable based multicast model for P2P Conferencing applications", Ultra Modern TELECOMMUNICATIONS &WORKSHOPS, 2009. ICUMT '09. International Conference On, [Online] 4, pp. 1-6, XP093168131, Piscataway, NJ, USA, Dec. 2009 (Dec. 4, 2009).

*Primary Examiner* — Robert W Beausoliel, Jr.
*Assistant Examiner* — Nirav K Khakhar
(74) *Attorney, Agent, or Firm* — Volpe Koenig

(57) ABSTRACT

A decentralized database distributed among a plurality of subscriber terminals, which database is formed from a plurality of individual subscriber databases containing respective data records which are synchronized, or are synchronizable, with one another via data channels, in which the subscribers are grouped together to form a dynamically changeable cluster. One subscriber in the cluster is selected, or selectable, as decision-maker; each of the subscribers locally produces entries in a subscriber data collection structure and transmits these entries at least to the decision-maker for clearance. The decision-maker successively arranges and clears its own entries and the entries received from the other subscribers in its subscriber database, and the other subscribers are designed to copy the cleared entries, in accordance with their arrangement in the subscriber database of the decision-maker, to their respective own sub- (Continued)

scriber database, after the clearance has taken place. The database is useable to conduct serverless video conferences.

24 Claims, 8 Drawing Sheets

(56) References Cited

U.S. PATENT DOCUMENTS

| | | | | |
|---|---|---|---|---|
| 10,904,481 | B1* | 1/2021 | Morris | H04N 21/6437 |
| 2009/0063665 | A1* | 3/2009 | Bagepalli | H04L 63/02 |
| | | | | 710/100 |
| 2011/0078129 | A1* | 3/2011 | Chunilal | G06Q 20/386 |
| | | | | 707/706 |
| 2013/0066830 | A1* | 3/2013 | Lacapra | G06F 16/178 |
| | | | | 707/624 |
| 2013/0132500 | A1* | 5/2013 | Vandwalle | H04L 67/1051 |
| | | | | 709/208 |
| 2015/0317371 | A1* | 11/2015 | Ramamurthi | G06F 16/27 |
| | | | | 707/628 |
| 2016/0285945 | A1* | 9/2016 | Pai | H04N 7/15 |
| 2017/0048286 | A1* | 2/2017 | Ichihashi | H04L 65/611 |
| 2020/0084248 | A1* | 3/2020 | Baram | H04L 65/752 |
| 2020/0250042 | A1* | 8/2020 | Sharma | H04L 67/60 |
| 2021/0352077 | A1* | 11/2021 | Benedetti | G06F 16/27 |
| 2022/0091920 | A1* | 3/2022 | Fujisaki | G06F 11/0778 |
| 2022/0107994 | A1* | 4/2022 | Bernardi | H04L 9/0841 |
| 2024/0256565 | A1* | 8/2024 | Fostiropoulos | G06F 16/27 |

* cited by examiner

DECENTRALIZED DATABASE, METHOD FOR MAINTAINING SAME, AND CONFERENCING APPLICATION BASED THEREON

CROSS-REFERENCE TO RELATED APPLICATIONS

This application claims priority from German Patent Application No. 10 2023 102 250.4, filed Jan. 31, 2023, which is incorporated herein by reference as if fully set forth.

TECHNICAL FIELD

The invention relates to a decentralized database distributed among a plurality of subscriber terminals or applications thereon, which database is formed from a plurality of individual subscriber databases containing respective data records, which data records are synchronized with one another, or able to be synchronized with one another, via data channels.

The invention furthermore relates to a computer-based conferencing application comprising the distributed database.

The invention furthermore relates to a method for maintaining a decentralized database distributed among a plurality of subscriber terminals or applications thereon, which database is formed from a plurality of individual subscriber databases containing respective data records, which data records are synchronized with one another, or able to be synchronized with one another, via data channels.

Finally, the invention relates to a method for conducting a computer-based conference, which method includes the method for maintaining a distributed database.

BACKGROUND

In recent times, videoconferencing systems have become an important and everyday tool, including due to the increased use of home offices in the wake of the coronavirus pandemic.

A wide variety of such systems are known, and there are an accordingly large number of videoconferencing providers that regularly access a central server held by providers. One disadvantage for the user here is that, in the course of a conference, a wide variety of personal data are transmitted to the videoconferencing provider or the server. In addition, this technology gives rise to corresponding server dependencies and server costs, which are typically passed on to customers or users.

There is accordingly a need for a solution that does not use a central server for the exchange of video and audio data, such that the video and audio data that are sent remain with the subscribers in the conference because the communication takes place without a server.

There is also a need for a solution that does not give rise to any server dependencies or server costs that are passed on to customers, thereby making video conferencing more economical.

The invention is based on the object of satisfying this need and, for this purpose, of specifying a decentralized database distributed among a plurality of subscriber terminals or applications thereon, a method for maintaining same, a conferencing application based thereon and a corresponding conferencing method, all of which do away with a central server and the associated problems in terms of data security, dependencies and usage costs.

This object is achieved by the decentralized database distributed among a plurality of subscriber terminals having one or more of the features disclosed herein, by the computer-based conferencing application having one or more of the features disclosed herein, by the method for maintaining a decentralized database distributed among a plurality of subscriber terminals having one or more of the features disclosed herein, and by the method for conducting a computer-based conference having one or more of the features disclosed herein.

Advantageous developments are defined in detail in the specification and claims that follow.

According to a first aspect of the invention, said invention provides a decentralized database distributed among a plurality of subscriber terminals or (software) applications thereon, which database is formed from a plurality of individual subscriber databases containing respective data records, which data records are synchronized with one another, or able to be synchronized with one another, via data channels, in which the subscribers are grouped together to form a dynamically changeable cluster; one of the subscribers in the cluster is selected, or able to be selected, as decision-maker; each of the subscribers is designed to locally produce entries in a subscriber data collection structure and to transmit these entries at least to the decision-maker for clearance; the decision-maker is designed to successively arrange and clear its own entries and the entries received from the other subscribers in its subscriber database; and the other subscribers are designed to copy the cleared entries, in accordance with their arrangement in the subscriber database of the decision-maker, to their respective own subscriber database, preferably successively in each case after the clearance has taken place.

According to a second aspect of the invention, said invention provides a computer-based conferencing application, comprising: the distributed database according to the first aspect of the invention; a conferencing application with a user interface, which conferencing application is executed, or able to be executed, on each subscriber terminal; a main application executed, or able to be executed, on each subscriber terminal, for connecting the respective conferencing application to the distributed database, in particular for creating suitable WebRTC data channels in one corresponding development.

According to a third aspect of the invention, said invention provides a method for maintaining a decentralized database distributed among a plurality of subscriber terminals or (software) applications thereon, which database is formed from a plurality of individual subscriber databases containing respective data records, which data records are synchronized with one another, or able to be synchronized with one another, via data channels, in which the subscribers are grouped together to form a dynamically changeable cluster; one of the subscribers in the cluster is selected as decision-maker; each of the subscribers locally produces entries in a subscriber data collection structure and transmits these entries at least to the decision-maker for clearance; the decision-maker successively arranges and then clears its own entries and the entries received from the other subscribers in its subscriber database; and the other subscribers adopt the cleared entries, in accordance with their arrangement in the subscriber database of the decision-maker, into their respective own subscriber database, preferably successively in each case after the clearance has taken place, most preferably automatically.

According to a fourth aspect of the invention, said invention provides a method for conducting a computer-based conference, that is to say computer-aided audiovisual communication, comprising: maintaining a distributed database according to the first aspect or according to the third aspect of the invention; providing and executing a conferencing application with a user interface on each subscriber terminal; connecting the respective conferencing application to the distributed database, preferably by executing a main application on each subscriber terminal, in particular by creating the WebRTC data channels in one corresponding embodiment.

Owing to the use of the decentralized database, within the scope of the invention, there is no need for any central server, in particular in order to conduct a video conference. This eliminates the discussed data problem, and no dependencies or additional costs arise. The solution according to the invention is particularly economical because it uses resources of the subscribers, which are active during the communication in any case.

The computer-based conferencing application may be in the form of what is known as a Web application that is executed, or able to be executed, in the browser of a user in each case. The Web application thus represents a novel videoconferencing system that is executed in the browser and makes do without a central server. The Web application basically consists of the decentralized database, which is distributed and synchronized across the conference subscribers. It preferably contains all relevant information in relation to the conference/cluster topology and makes it possible for example to be able to display and listen to active subscribers in the conference (VIP speakers), while passive subscribers (listeners) are able to be placed in the background fully automatically and dynamically.

The application and the associated data security are preferably subject to the following basic technical constraints:

The application is preferably a Web application and uses the following protocols in particular:
  https for downloading the application to the browser of a subscriber/user;
  WebRTC to set up the distributed database and a conference based thereon (UDP/TCP and high portrange);
  the database is a dedicated piece of software and preferably written in JavaScript;
  the conferencing application is a separate, dedicated piece of software and preferably written in JavaScript.

Preferably, no data whatsoever pass through a central server.

However, it is possible to use certain helper technologies to set up a conference (a subscriber cluster) and/or to update said conference in the event of terminations. Each of these helper technologies is a building block and may in principle be modified or replaced by another suitable technology.

Some embodiments of the invention may make provision for personal data to be exchanged (exclusively) via these helper technologies.

Said helper technologies comprise:
  STUN server: used to ascertain connection addresses (IP/port). May also be used to punch holes in firewalls. There are freely usable STUN servers that are able to be used without having to set up a dedicated server for this purpose. The following (personal) data may be exchanged via the STUN server: IP, port.
  Signal server: used to send connection data (IP/port/video and audio metadata) to other subscribers. The following (personal) data are exchanged via the signal server: IP/port/video and audio metadata.
  TURN server: optional server that intervenes as an intermediary in order to transmit audio and video streams if the technical requirements for a conference are not met. The following (personal) data are exchanged via the TURN server: IP/port/video and audio metadata and securely encrypted video and audio streams.

Advantageous embodiments of the decentralized, distributed database in the browser comprise one or more of the following features:

The database is a JavaScript application that runs in the browser of a subscriber or user.

According to the invention, it is a decentralized, distributed database. It is said to be "distributed" because the data are copied and distributed to a plurality of (subscriber) databases, that is to say databases managed by the individual subscribers, that is to say for example on their terminals. It is said to be "decentralized" because there is no master database. All databases are equivalent.

Each individual database preferably runs only in the browser and is combined with the other databases in other browser tabs to form a distributed, decentralized cluster. The databases preferably synchronize their data records (entries) with one another automatically.

The produced data are preferably stored locally in the browser of the user's own computer/terminal and are never sent to central servers. The data are preferably stored only as long as a corresponding browser tab remains open.

In the course of one extremely advantageous approach, that is to say one embodiment of the invention, what is known as an append-only log forms the basis of the implementation. An append-only log is a storage medium that is only permitted to be written to and that is never permitted to be erased. Each entry is preferably given its own ID or identification, which may be continuous. This concept is simple and highly effective. A Merkle Tree and a blockchain are well-known examples of an append-only log.

Such a log is probably the simplest possible memory abstraction. It is an ordered sequence of data records that is ordered by time and is able to be expanded only by appending (addition). The new data records are appended to the end of the log. The order of the data records thus defines a concept of "time", since newly appended entries on one side of the log are defined as being older than entries on the other side. The number of a log entry may thus be considered to be a kind of "timestamp" of the entry. The description of the order as a concept of time has the practical property that it is decoupled from any specific physical clock. This property is important when using logs in distributed systems, for example the mentioned subscriber cluster.

In other words: In an append-only log, the data may be considered to be an ordered sequence of data entries. The unambiguous sequence arises as a result of the chronological order in which the data records were entered in the append-only log. This is why reference is made to chronologically unambiguously ordered data records. A unique timestamp may be assigned to each data entry. However, this timestamp is only of lesser significance to the append-only log itself; it is more useful for applications that work with append-only logs.

A log does not differ significantly from a file or a table: A file is an array of bytes, a table is an array of data records, and a log is actually just a kind of table or file in which the data records are sorted by time (of their production or of their entry).

WebRTC data channels may be used within the scope of the invention for the mutual connection of the individual databases to one other and the associated data exchange. Local independent append-only logs constantly exchange their data with one another in this case.

WebRTC (Web Real-Time Communication) is an open standard that is well known per se and that defines a collection of communication protocols and programming interfaces (API) that enable real-time communication via computer-to-computer connections. This allows Web browsers to retrieve not only data resources from back-end servers, but also real-time information from browsers of other users.

Since simultaneous changes to a database entry represent a major problem with decentralized, distributed databases, within the scope of the invention, use is made of a single decision-maker ("committer"), which determines the order of the changes, in order to maintain the consistency of the distributed data.

The committer, in one corresponding embodiment of the invention, determines the order of the changes in the append-only log. The committer therefore preferably works on the append-only log and not on the database. Based on append-only logs, it is possible to program further principles of a database in a manner known per se (delete, insert, select, update).

Strictly speaking, the basic building block of the present invention is thus initially "only" a log, and not yet a fully-fledged database. However, in abstract terms, reference may by all means already be made to a database because, according to the above, a database may easily be developed on the basis of such a log. In this case, reference is thus made to a database in the broader sense, the operation of which may be ascribed to a log.

Each individual subscriber, in one corresponding embodiment of the invention, is able to change any data record or entry in the database, but must have this confirmed by the committer. The chronological order of the entries and changes is therefore determined solely by the committer. This process is also referred to as "committing" here. Quasi-simultaneous changes are thus put into an order in order to achieve data consistency.

One fundamental problem when implementing the present invention is that of defining or negotiating the decision-maker (committer): While central (back-end) servers have a relatively long lifespan (of the order of magnitude of minutes, hours, months up to years) and therefore take a relatively long time when negotiating a decision-maker, which also accordingly has a long lifespan, this is not the case for the preferred use in a browser. On the contrary, an expected life expectancy here is in the range of seconds.

This problem has been made into a fundamental principle in certain embodiments of the invention: In such embodiments, a committer has a lifetime of only a few seconds. Each (subscriber) database participating in the cluster may be a committer or have a committer or be operatively connected to a committer. Any change in the setup of the cluster preferably leads to a new definition (renegotiation) of the committer. Only data that have been committed to the database by a committer contain truthful content and are relevant for use, in one corresponding embodiment of the invention. A newly ascertained committer is designed such that and preferably first ensures that all commits, that is to say the committed entries of the previous committer, are distributed to all subscribers or their databases, before it in turn produces new commits.

In accordance with the CAP theorem, within the scope of the invention, compromises are made both in terms of consistency and in terms of availability. The CAP theorem or Brewer's theorem states that, in a distributed system, it is impossible to simultaneously guarantee the three properties of consistency, availability and partition tolerance. As a result, the individual databases are not always in the same state. In order to generate the same state within the scope of the invention, the cluster is preferably briefly stopped and synchronized.

The following developments of the abovementioned aspects of the present invention have proven to be particularly advantageous:

In one development of the distributed database according to the invention, each change of the cluster is associated with a new selection of the decision-maker.

This makes it possible in particular to ensure that the cluster is able to continue to work if the last decision-maker is no longer present.

A corresponding embodiment of the method according to the third aspect of the invention makes provision for a new selection of the decision-maker to take place after each change of the cluster.

In one development of the distributed database according to the invention, each individual subscriber has a unique identification and is configured to communicate this identification to the other subscribers in the cluster, preferably upon each change of the cluster, wherein each individual subscriber is configured to unambiguously determine the decision-maker on the basis of the identifications communicated thereto. To this end, a mathematical order relation is formed on the set of all possible identifications. The order relation must have the mathematical properties of reflexivity, antisymmetry, transitivity and totality. With the aid of this order relation, each subscriber is able to unambiguously determine the mathematical order of each subscriber. And each subscriber is thereby able to ascertain the decision-maker on its own based on identifications, for example the one in first place within said order.

Each subscriber is thereby able to unambiguously identify the decision-maker itself, without this requiring a superordinate central unit. In particular, the subscriber with the largest (alphanumeric) identification may be the (new) decision-maker.

One corresponding embodiment of the method according to the third aspect of the invention makes provision for each individual subscriber to have a unique identification and to communicate this identification to the other subscribers in the cluster, preferably upon each change of the cluster, wherein each individual subscriber unambiguously determines the decision-maker on the basis of the identifications communicated thereto, for example by arranging the identifications in an unambiguous order and selecting a subscriber with a predetermined placement within this order as decision-maker, in particular the one in first place.

In one development of the distributed database according to the invention, the subscriber databases and/or the subscriber data collection structures are stored exclusively locally on the respective subscriber terminal, in particular in a Web browser.

This ensures the greatest possible data security.

A corresponding embodiment of the method according to the third aspect of the invention makes provision for the subscriber databases and/or the subscriber data collection structures to be stored exclusively locally on the respective subscriber terminal, in particular in a Web browser.

In one development of the distributed database according to the invention, the individual subscriber databases are connected to one another via data channels in the form of WebRTC data channels.

A corresponding embodiment of the method according to the third aspect of the invention makes provision for the individual subscriber databases to be connected to one another via data channels in the form of WebRTC data channels.

The specific advantages of this embodiment have already been discussed further above.

In one development of the distributed database according to the invention, the individual subscriber data collection structures (and preferably also the subscriber databases) are in the form of storage media that are only able to be written to and that cannot be erased, that is to say in the form of what are known as append-only logs.

This makes it possible to easily integrate a type of timestamp, as has already been discussed further above.

A corresponding embodiment of the method according to the third aspect of the invention makes provision for the individual subscribers to store their entries in subscriber data collection structures that are in the form of storage media that are only able to be written to and that cannot be erased (append-only log).

In one development of the distributed database according to the invention, each entry comprises at least one addition by way of which it is able to be identified unambiguously, in particular with regard to the subscriber producing it and/or the temporal position of its production.

If the entries are able to be identified unambiguously, subscribers are easily able to monitor the database for the presence of certain (their own) entries if these are not allowed to be lost (what is known as a write guarantee).

A corresponding embodiment of the method according to the third aspect of the invention makes provision for at least one addition to be added to each entry that allows it to be identified unambiguously, in particular with regard to the subscriber producing it and/or the temporal position or order of its production.

In another development of the distributed database according to the invention, at least a number of the subscribers are configured to continuously monitor the entries copied to the respective subscriber database and, if necessary, to transmit an entry of their own not contained therein again to the decision-maker for clearance.

For this purpose, it is possible in particular to use the addition mentioned further above in order to monitor the entries.

A corresponding embodiment of the method according to the third aspect of the invention makes provision for at least a number of the subscribers to continuously monitor the entries copied to the respective subscriber database and, if necessary, to transmit an entry of their own not contained therein again to the decision-maker for clearance.

In one development of the distributed database according to the invention, the subscribers are designed to transmit or display, together with or in addition to the identification, that is to say for example in the event of a change of the cluster, a current state of their respective subscriber database, in particular in the form of a last entry contained in their respective subscriber database, in particular on the basis of the abovementioned addition; and a newly ascertained decision-maker is designed to first ensure that all of the subscriber databases have the same state, in particular by transmitting the entries cleared by a previous decision-maker to the individual subscriber databases, before the newly ascertained decision-maker produces further clearances.

This corresponds to the wording selected further above, according to which the cluster is "stopped" so that all subscribers are first able to update their databases to the same state.

A corresponding embodiment of the method according to the third aspect of the invention makes provision for the subscribers to transmit or display, together with or in addition to the identification, a state of their respective subscriber database, in particular in the form of a last entry contained in their respective subscriber database, in particular by transmitting said addition; and for a newly ascertained decision-maker to first ensure that all of the subscriber databases have the same state, in particular by transmitting the entries already cleared by a previous decision-maker to the individual subscriber databases, before the newly ascertained decision-maker itself produces further clearances.

In one development of the distributed database according to the invention, the entries contain information about a topology of the cluster.

This in particular makes it possible to ensure that all subscribers in a conference set up the correct data channels to the respective other subscribers (send and/or receive, VIP speakers or mere listeners).

One development of the conferencing application according to the invention comprises at least one of the following helper technologies for setting up the cluster (the conference) or for updating the cluster (the conference) in the event of terminations, namely:

a) a STUN server for ascertaining connection addresses, in particular IP and/or port addresses of the subscribers, and/or for creating holes in firewalls present at the subscribers;

b) a signal server for sending connection data, in particular IP/port/video and audio metadata to subscribers of the cluster;

c) an optional TURN server that is designed to intervene as an intermediary in order to transmit audio and video streams, preferably in encrypted form, if the technical requirements for a conference are not met.

A corresponding embodiment of the method according to the fourth aspect of the invention comprises setting up the cluster (the conference) or updating the cluster (the conference) in the event of terminations by using a) a STUN server for ascertaining connection addresses, in particular IP and/or port addresses of the subscribers, and/or for creating holes in firewalls present at the subscribers;

b) a signal server for sending connection data, in particular IP/port/video and audio metadata to subscribers of the cluster; and/or c) an optional TURN server as an intermediary in order to transmit audio and video streams, preferably in encrypted form, if the technical requirements for a conference are not met.

Reference has already been made to this further above.

A TURN server may already be end-to-end encrypted or communicate by specification. Preferably, any media transmission within the scope of the present invention is end-to-end encrypted.

Another development of the conferencing application according to the invention comprises an algorithm, preferably in the main application, which is designed to decide which subscribers transmit video and/or audio streams to one another, for which purpose each subscriber is assigned a number, in particular starting at one and increasing, which numbers are preferably allocated on the basis of a chronological order in which a subscriber dials into the cluster (the conference), wherein it is possible, in the conferencing application for each subscriber, to define the other subscriber to which a video/audio stream is to be opened, wherein the individual subscribers coordinate with one another via the data channels, preferably in accordance with the known cluster topology.

A corresponding embodiment of the method according to the fourth aspect of the invention makes provision for a decision to be made as to which subscribers transmit video and/or audio streams to one another, by virtue of each subscriber being assigned a number, in particular starting at one and increasing, which numbers are preferably allocated on the basis of a chronological order in which a subscriber dials into the cluster (the conference), wherein it is possible, for each subscriber, to define the other subscriber to which a video/audio stream is to be opened, wherein the individual subscribers coordinate with one another via the data channels, preferably in accordance with the known cluster topology.

The subscribers are thereby easily able to be identified and connected to the desired conference. The topology is able to be dynamically modified easily and quickly by using the decentralized database, in particular by virtue of subscribers swapping their places within the topology and this being communicated to the entire cluster.

Yet another development of the conferencing application according to the invention makes provision for video and/or audio streams to be able to be dynamically added to and/or removed from an existing data channel connection, in particular WebRTC connection, wherein each subscriber has a transmitting and a receiving transceiver, for which purpose the application, in particular the main application, is designed to open or to close the video and/or audio stream transceivers in question on both subscriber sides of the data channel in question.

A corresponding embodiment of the method according to the fourth aspect of the invention makes provision for video and/or audio streams to be dynamically added to and/or removed from an existing data channel connection, in particular WebRTC connection, wherein each subscriber has a transmitting and a receiving transceiver, for which purpose the video and/or audio stream transceivers in question are opened or closed on both subscriber sides of the data channel in question.

This makes it easy to dynamically update a conference.

BRIEF DESCRIPTION OF THE DRAWINGS

Further properties and advantages will become apparent from the following description of exemplary embodiments with reference to the drawing.

DETAILED DESCRIPTION

In the figures, the same reference signs refer to identical or at least functionally identical elements.

Figure 1:
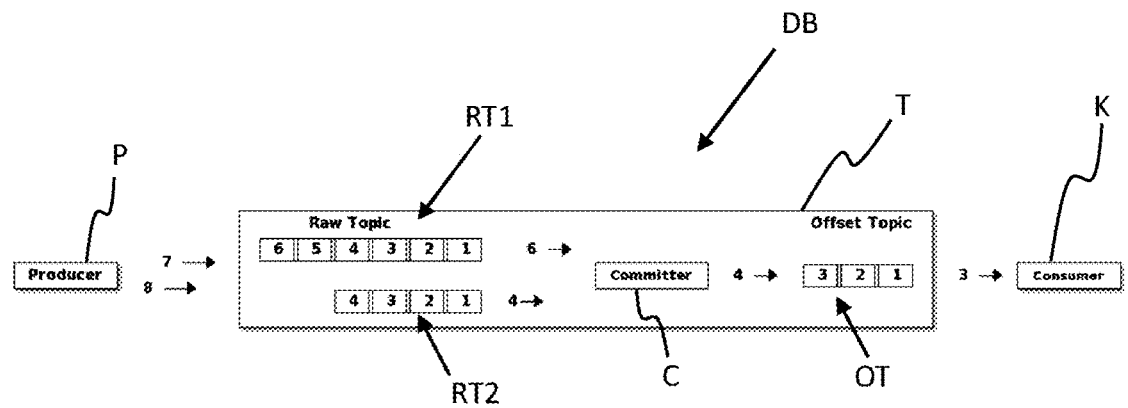
FIG. 1 shows an append-only log storage medium.

FIG. 1 illustrates the use of an append-only log, as may be used within the distributed database within the scope of the invention.

Specifically, FIG. 1 illustrates the data stream in more detail. The database according to the invention or the log on which it is based (see above; hereinafter also referred to as "AlfaLog") stores each received message in the form of a data record in what is known as a topic T. The individual messages are illustrated as numbers 1, 2, 3, . . . in FIG. 1. They originate from one (or more) producer(s) P and are written to the topic T. For the sake of clarity, a topic T may also be seen as a database table, while AlfaLog itself represents the database. AlfaLog may therefore consist of a large number of topics T or comprise same. FIG. 1 denotes the database with reference sign DB.

A topic T is accordingly an append-only, fully ordered sequence of data records, ordered by the time at which they are produced. A topic T is therefore an append-only log, as has already been explained in the introduction.

According to FIG. 1, a producer P writes data records 1, 2, 3, . . . to a topic T, and a consumer K reads data records 1, 2, 3, . . . from a topic T.

As already indicated, the fully ordered sequence of data records 1, 2, 3, . . . , due to the time at which they are produced, is a key property and is of critical importance to distributed data systems. In the embodiment shown of the invention, this leads to an important design decision: In order to comply with the chronological order of the data records 1, 2, 3, . . . , there may only be one source for a topic. In practice, however, it is difficult to limit the number of producers P. In distributed systems in particular, there will often be a large number of producers P that produce and write data records 1, 2, 3, . . . .

Since there are a plurality of sources, the AlfaLog database DB uses a committer approach to create linearity. In addition, AlfaLog uses two types of data records 1, 2, 3, . . . : There are raw data records that are written to what is known as a raw topic, and there are approved, ordered data records that are written to what is known as an offset topic. FIG. 1 illustrates, at RT1 and RT2, by way of example, two such raw topics to which data records 1, 2, 3, . . . are written by the producers P in the order in which they are produced, in this case the data records 7 and 8. What is known as a committer or decision-maker C reads the entries from the raw topics RT1 and RT2, here the entries 6 and 4, and transmits them in an unambiguous order to the offset topic OT. The entries are then present there in fully ordered form, with an unambiguous order. In the example shown, entry 4 is written to the offset topic OT first, followed by entry 6 later on. The chronological sequence of entries gives rise to a natural order. It is this order alone that is important; time is merely the "cause" of this order.

According to FIG. 1, the raw topics RT1 and RT2 each have their own data record order. However, this order is not important. The committer C alone, as the sole producer of the offset topic OT, determines the order of the entries in the offset topic OT. Entry 4 and entry 6 are the last entries in the raw topics RT1 and RT2 and arrive at the committer C with a time offset. This determines their new, unambiguous order.

In the local case, that is to say in the case of only one subscriber, this does not seem to be particularly useful. However, AlfaLog is designed as a distributed log (distributed database). This circumstance advantageously requires each client, that is to say in particular each new client (that is to say each (new) subscriber), to create what is known as a raw record for each other client (raw topics contain what are known as raw records (that is to say raw entries)).

As already explained, each topic actually consists of two topics (raw topic RT and offset topic OT). The committer C exists between the two topics RT, OT and transmits the data from the raw topic RT to the offset topic OT. According to FIG. 2 in particular, a topic T accordingly consists of the three basic classes of committer C, raw topic RT and offset topic OT (cf. also FIG. 1). The offset topic OT contains the transmitted data records and the actual data. The raw topic is a subscriber data collection structure in the manner of a data sink. It should be pointed out once again that, according to the invention, there is only exactly one committer C for the offset topic OT in the distributed system (cluster consisting of a plurality of subscribers). In other words, the offset topic OT has only one producer, namely the committer C, which is defined by a unique ID or UUID, here: A13232AEB35, which is able to identified (and ascertained) unambiguously. This will be discussed in more detail below with reference to FIGS. 4 to 6.

Figure 2:
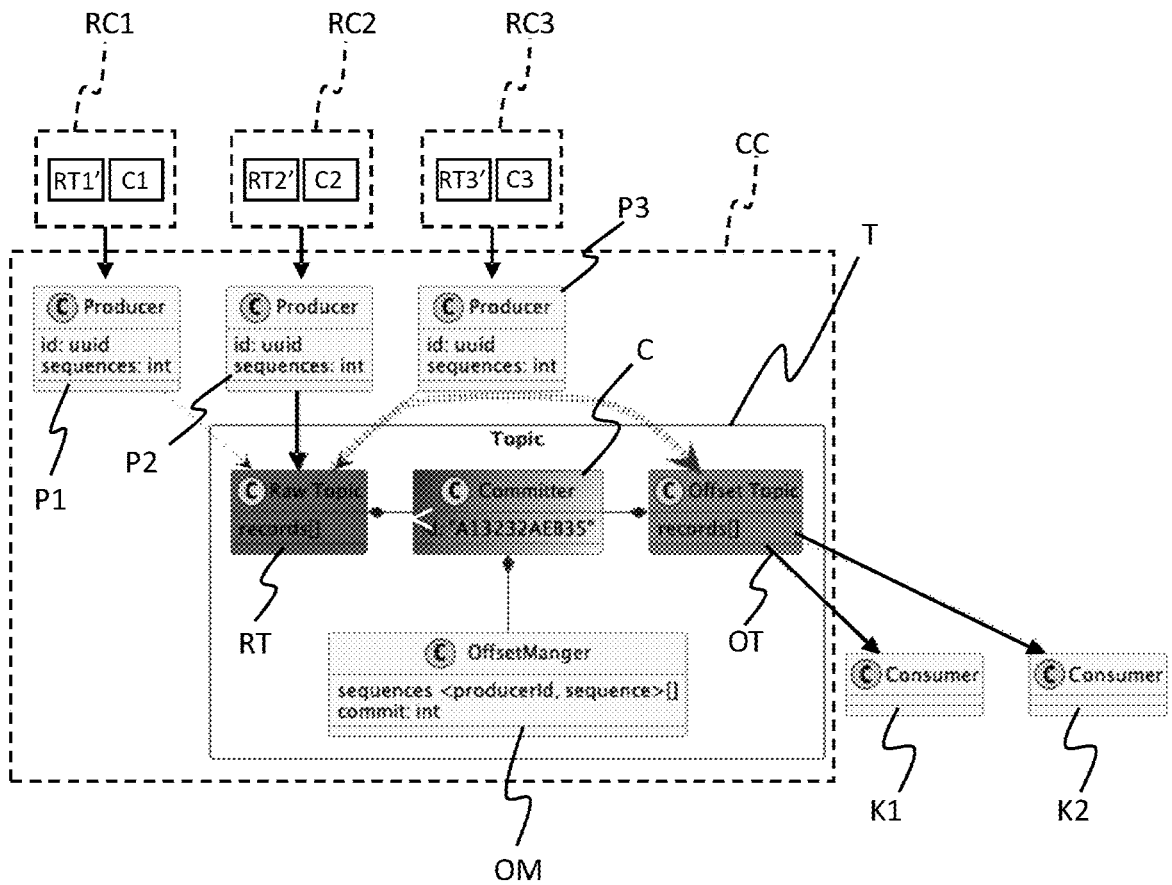
FIG. 2 illustrates the function of the decision-maker or committer.

As shown in FIG. 2, a plurality of producers P1-P3 write to a raw topic RT, and the committer C, as instructed by what is known as an offset manager OM, transmits the data from the raw topic RT to the offset topic OT, where they are read by a plurality of consumers K1, K2. In particular, the offset manager counts the number of entries in the offset topic OT. The entries are numbered consecutively, and this number is called an offset. There is no point in counting or consecutively numbering the raw topic entries because they are 'chaotic'.

In this context, write guarantees for data records such as "at most once", "exactly once" and "at least once" are important for the development of functions. Each producer P1-P3 has a unique identification or ID ("uuid") and manages a sequence list ("sequences"), according to which each produced data record is assigned a number, for example. Each data record is thus assigned a sequence (number) and the ID of the respective producer P1-P3. Each producer P1-P3 is usually also a consumer K1, K2 of the offset topic OT.

Write guarantees may be implemented with the aid of the producer ID and the sequence number. By way of example, a producer P1 as consumer (for example K1) may monitor the offset topic OT to determine whether a specific data record that it has produced itself and that it is able to recognize based on the producer ID and the sequence number appears in the offset topic OT. If this is not the case, for example after a certain period of time, it is possible to ensure, for example in the case "at least once", that the producer P1 in question re-enters the specific data record in the raw topic RT so that the decision-maker C is able to transmit it to the offset topic OT.

The required data consistency may be achieved as follows within the scope of the invention: Hereinafter, the producers are embodied by clients. A client—also referred to as a client-side application, client application or client program—denotes a computer program that is executed on the terminal of a network (that is to say of a subscriber here). A device itself that retrieves services from the network is sometimes also referred to as a client. A distinction is made here between remote clients RC1-RC3 and the (local) committer client CC. The committer client CC is the program that provides the committer C within the scope of the invention (more detail in this regard below). Each remote client RC1-RC3 creates a producer P1-P3 on the active committer client CC for the raw topic RT there (cf. FIG. 2). Data records that are written to the local raw topic RT1'-RT3' of the individual remote clients RC1-RC3 are also automatically written to the raw topic RT of the active committer client CC. The chronological sequence of the data records may or will be different here for each client RC1-RC3, CC, whereas only the order produced by the committer C is important in the offset topic OT. Strictly speaking, each (remote) client produces a producer on each other client. However, often only the producer in question on the currently active committer is necessary. Therefore, the other producers are preferably deactivated (not active).

Each client contributing to a topic T has its own committer C1-C3, C, but only one of these committers is active at any time. Each committer C1-C3, C preferably has a unique identification (uuid). For all clients with inactive committers (all clients except for the committer client CC), the direct connection between the raw topic and the offset topic is interrupted.

Figure 3:
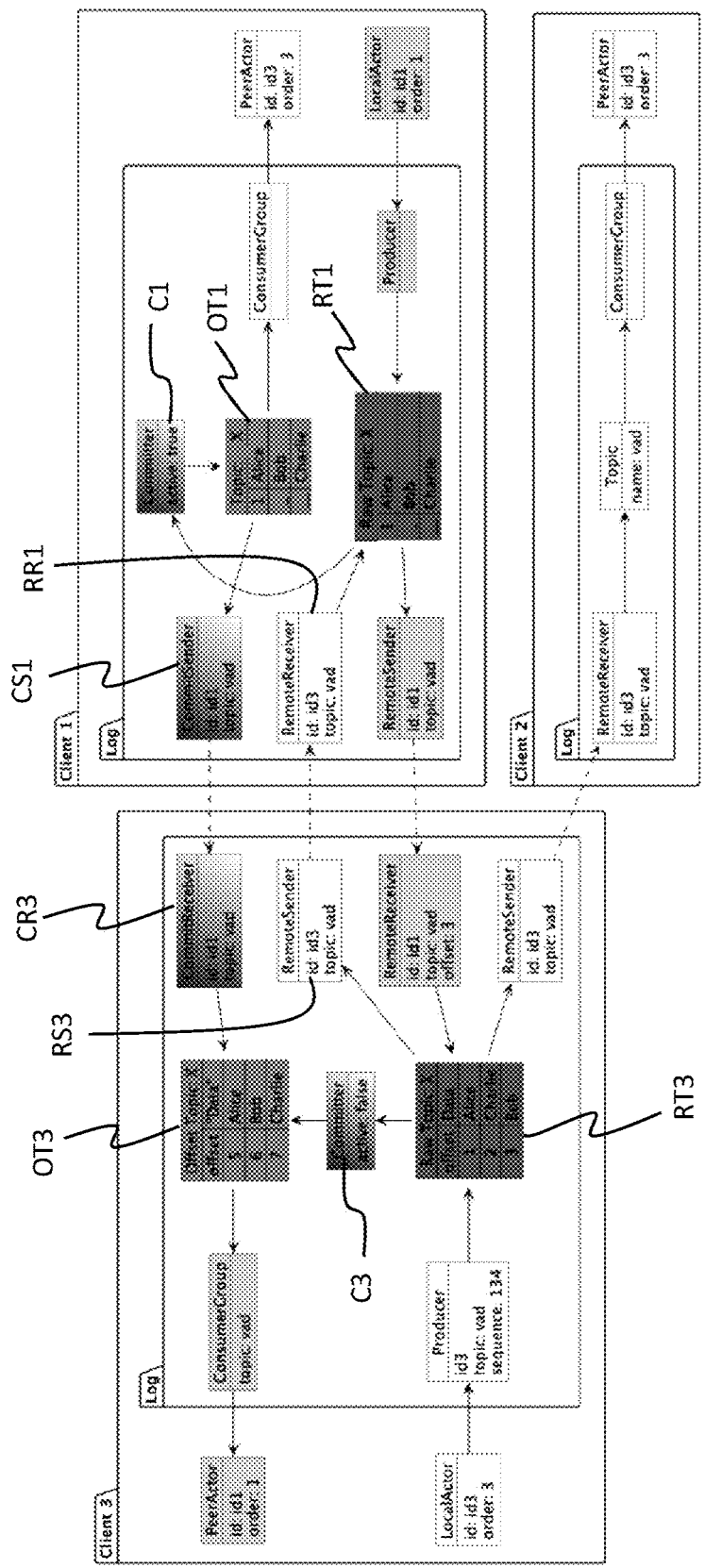
FIG. 3 illustrates the synchronization of the subscriber databases.

This is illustrated in more detail by way of example in FIG. 3, where two clients (client 1, client 3) are for example shown in detail, and where the following applies for client 3: "Committer, active: false" (C3). The following applies for client 1, on the other hand: "Committer, active: true" (C1). All clients write only to their own local raw topic RT1, RT3. The data records are then copied by RemoteSender RS3 and RemoteReceiver RR1 to the raw topic RT1 of the active committer C1 (client 1). The same may apply accordingly to client 2 (not shown). Only the active committer C1 writes data to its offset topic OT1. In doing so, it also writes the data records produced by the other clients from its raw topic RT1 to its offset topic OT1, and thereby determines the order of all data records. The (confirmed or cleared) data records ordered by the active committer are distributed from the offset topic OT1, via CommitSender CS1 and CommitReceiver CR3, to the offset topic OT3 of the other clients, and are thereafter all that is important. This is illustrated explicitly in FIG. 3 for the client 3 only.

One important aspect of the invention is the negotiation (definition) of the active committer. It should be noted here that the lifetime of a committer in a browser is generally only seconds. In contrast to server-based back-end systems, this is a very short period of time. Therefore, committers that are provided by browser applications are not stable either. A constant change of committer has to be assumed within the scope of the invention.

In a constantly changing system, it is necessary to find constant system states in order for the system to be able to function. The described AlfaLog system may basically be in two states:

State 1: The committer is selected. This committer takes over the ordering of the data records.

State 2: Committer negotiation process. A current committer is not (has not yet been) selected and has to be determined (again).

The state changes of AlfaLog (the distributed database) are triggered by clients, that is to say subscribers or their programs joining or leaving a conference, or their role (speaker, listener). Each of these events brings about a transition to the second state and then a (new) first state.

Within the scope of one preferred embodiment, this means that, each time a new WebRTC connection (between two clients) is established or terminated, the committer negotiation process (state 2) is restarted. This is preferably completely independent of whether or not a process that is already in progress has been completed.

One example of such a process is when two clients are in a conference, then a third client joins the conference as a (new) committer and the committer negotiation begins, in response to which (shortly thereafter) a fourth client joins the conference as a (new again) committer, such that the committer negotiation starts again and the committer negotiation that is already in progress is terminated.

AlfaLog thus constantly changes back and forth between said two states. An explanation is in particular intended to be given below as to how the transitions between the two states may take place.

A transition between the two system states is preferably initiated whenever something changes on the subscriber cluster or client cluster. This essentially involves two events, namely when a client newly connects to the cluster (FIG. 4 and FIG. 5) and when a client leaves the cluster (FIG. 6). Each individual client recognizes these changes on its own and preferably independently of the other clients.

If a client recognizes a new client or detects that a client is no longer present, this client immediately closes the active connection to the committer, cf. FIG. 3. This means that data records are no longer able to be transmitted. The AlfaLog stops for the client in question. At a respective later time, AlfaLog will also stop for all other clients, since they will likewise register said change in the cluster. Due to the associated time shift or time difference, AlfaLog is in an inconsistent data state, since some clients may have received more confirmed data records, that is to say data records cleared by the previous committer, than others.

As soon as a client has deactivated its committer connection, it starts the committer negotiation process, which initiates the transition to the second system state.

As has already been indicated, each client selects the active committer independently of the other clients, wherein the result should be consistent. In order to achieve the same result for all clients, each client requires an identical list containing the potential committers of all available clients, and then applies a unique order relation to the set of possible UUIDs (identifications) of the committers. With the aid of this order relation, a committer is able to be selected unambiguously and autonomously from the list of committers by each client.

In particular, the order relation has to meet the following mathematical criteria: reflexive, transitive, antisymmetric, and strongly connected, also referred to previously as "total". Generally speaking, order relations in mathematics are generalizations of the "less than or equal to" relationship. They make it possible to compare elements of a set with one another.

Each committer preferably has a unique identification or UUID. Said order relation makes it possible to put the UUIDs in an unambiguous order and to select the active committer, for example the first one from said order.

The event whereby a new client joins a conference is triggered by the initialization of at least one new data connection, in particular WebRTC connection. Each client establishes a peer-to-peer connection to each other client in the cluster. A new client thus successively establishes a connection to each other client in the cluster. For this reason, some clients in the cluster know that a new client has been added earlier than others. This is an important point that needs to be taken into consideration.

The event of joining and leaving itself is not intended to be discussed in any more detail here. Once it has been created, the data channel of the peer-to-peer connection is used to exchange data between the clients in question.

When a client joins an existing cluster, it either may or may not take on the role of (active) committer therein. It is purely random, or preferably dependent only on the UUID of the client in question, whether the committer of the new client becomes the (active) committer. This is an important point since, within the scope of the invention, there is no central entity that exists at all times and could act as a committer or define same. As already mentioned, data are only exchanged from peer to peer.

If a client joins a conference as the first client in the conference or opens said conference and no other client is yet in the conference, its committer is initially inactive. After a certain period of time and if no one else has joined the conference, its committer may preferably be activated automatically.

Figure 4:
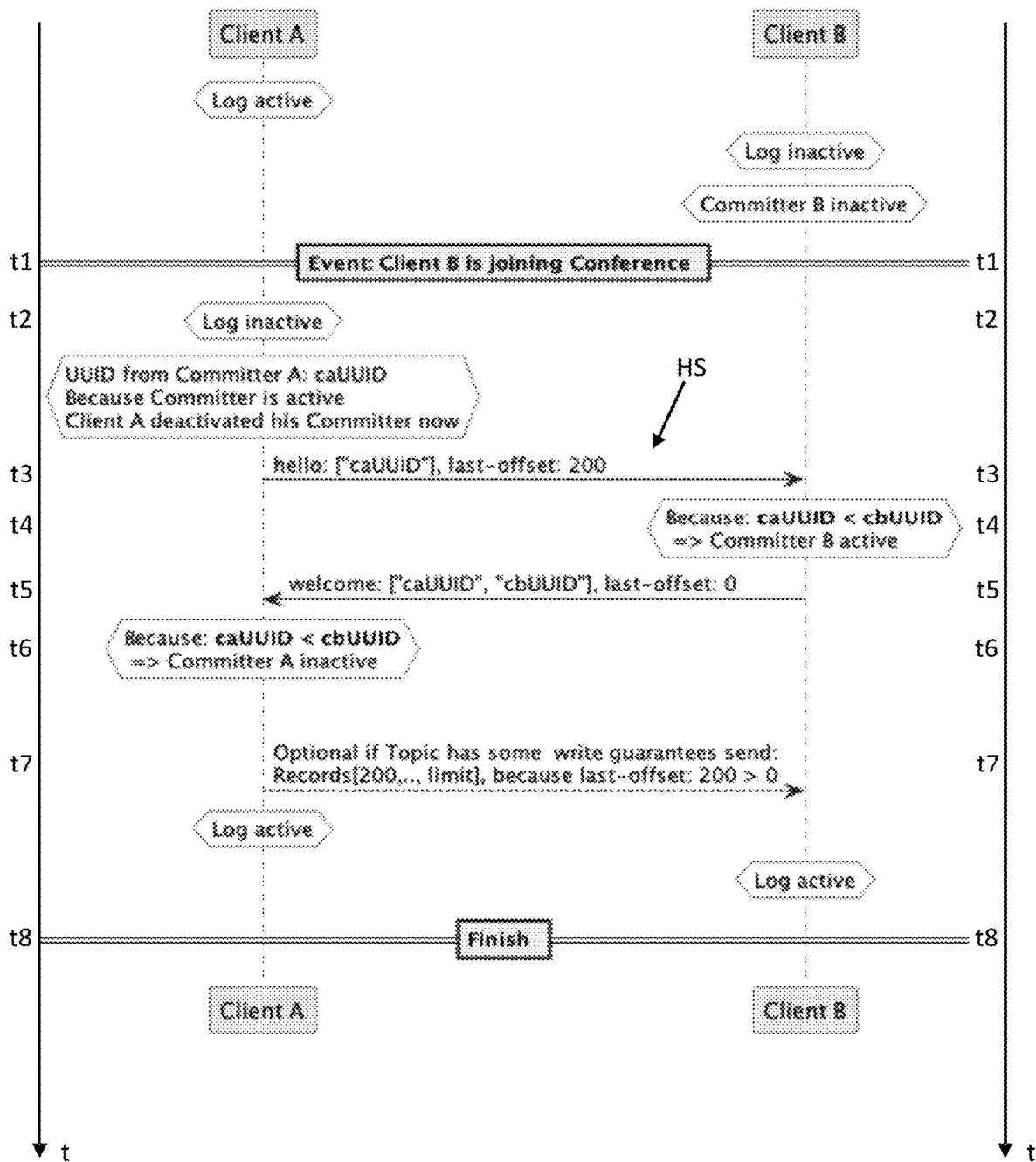
FIG. 4 illustrates one possible negotiation of the decision-maker.

In the case of two clients in the conference, regardless of whether the first client has or has not already activated its committer, when a second client enters the conference, a committer selection process begins with a welcome handshake, as shown in FIG. 4 (first client: client A, second client: client B).

According to FIG. 4, client B enters the conference at the time t=t1, the conference having consisted previously only of client A, whose committer was active. At the time t2, client A deactivates its committer and, at the time t3, client A sends the welcome handshake HS to the client B.

It does not matter who initiates the handshake HS. What is important is that both clients deactivate their respective log (the database) beforehand. This creates a stable data state. Each client sends all committer UUIDs known thereto and its last commit offset. The commit offset indicates the (sequential) numbering of the last entry in the offset topic of the client in question. By way of example, client A sends said information in the "hello" message according to FIG. 4 at the time t3. "caUUID" denotes its UUID, the commit offset is 200. Client B responds thereto at the time t5 with a "welcome" message (containing its own ID "cbUUID" and its commit offset=0). Taking this as a basis, each client determines the next committer on its own by applying the abovementioned order relation to the IDs "caUUID" and "cbUUID" and activates its log. In this case, client B already knows, at the time t4<t5, that it will be the new committer ("committer B active"), because the unique order relation results in caUUID<cbUUID. Client A determines, at the time t6, that it will not be the new committer ("committer A inactive").

It is not particularly important when the clients each reactivate their logs. If necessary, the write guarantees of the topic ensure that the data records are synchronized, that is to say that the offsets are exchanged. This means, for example, in specific terms, that client A sends its offset topic entries up to entry 200 to the client B at the time t7 if its write guarantee stipulates this (for example "at least once", "exactly once", . . . ), because client B has no entries whatsoever. At the time t8, the negotiation is complete.

Figure 5:
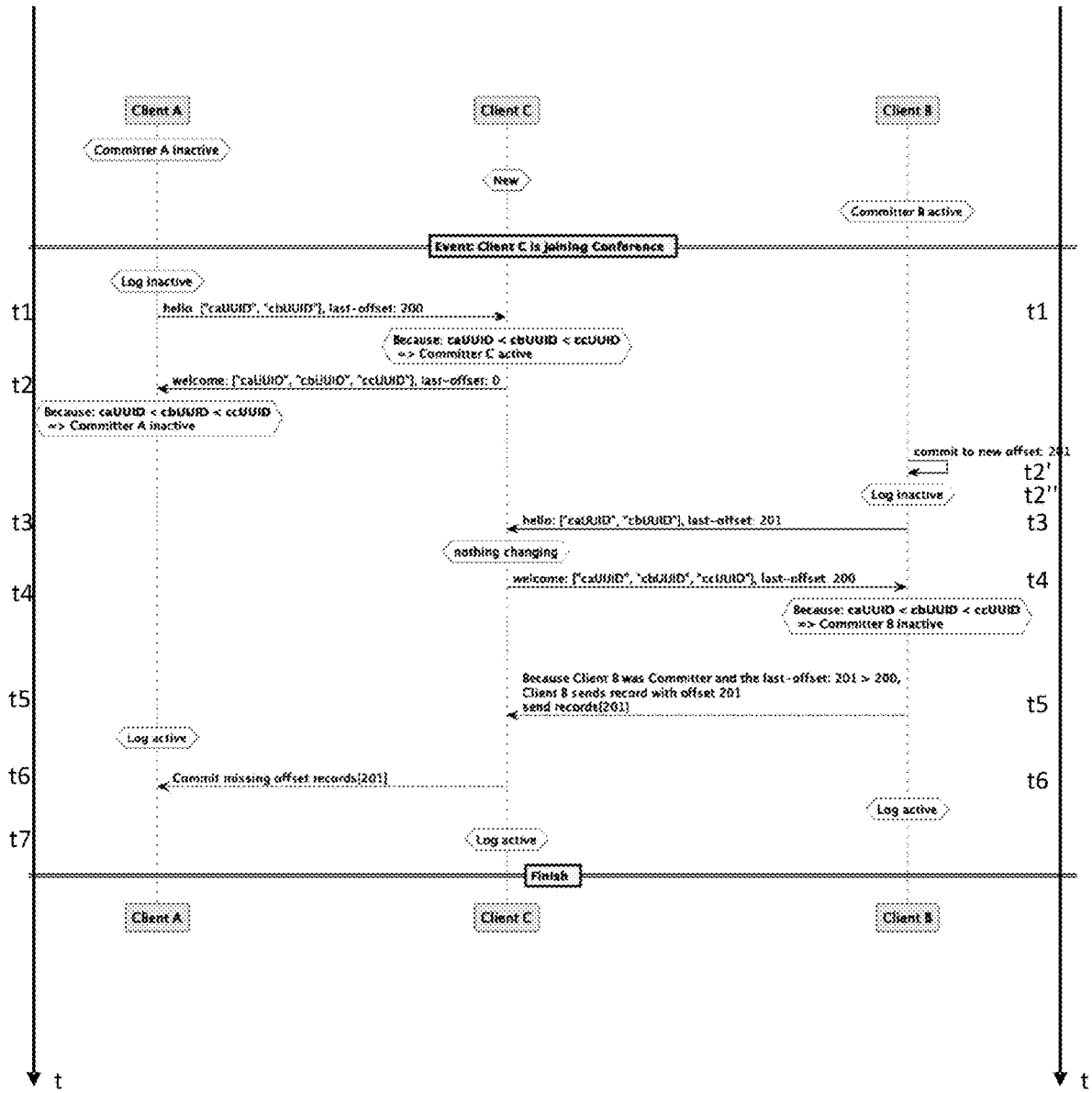
FIG. 5 illustrates another possible negotiation of the decision-maker.
Figure 6:
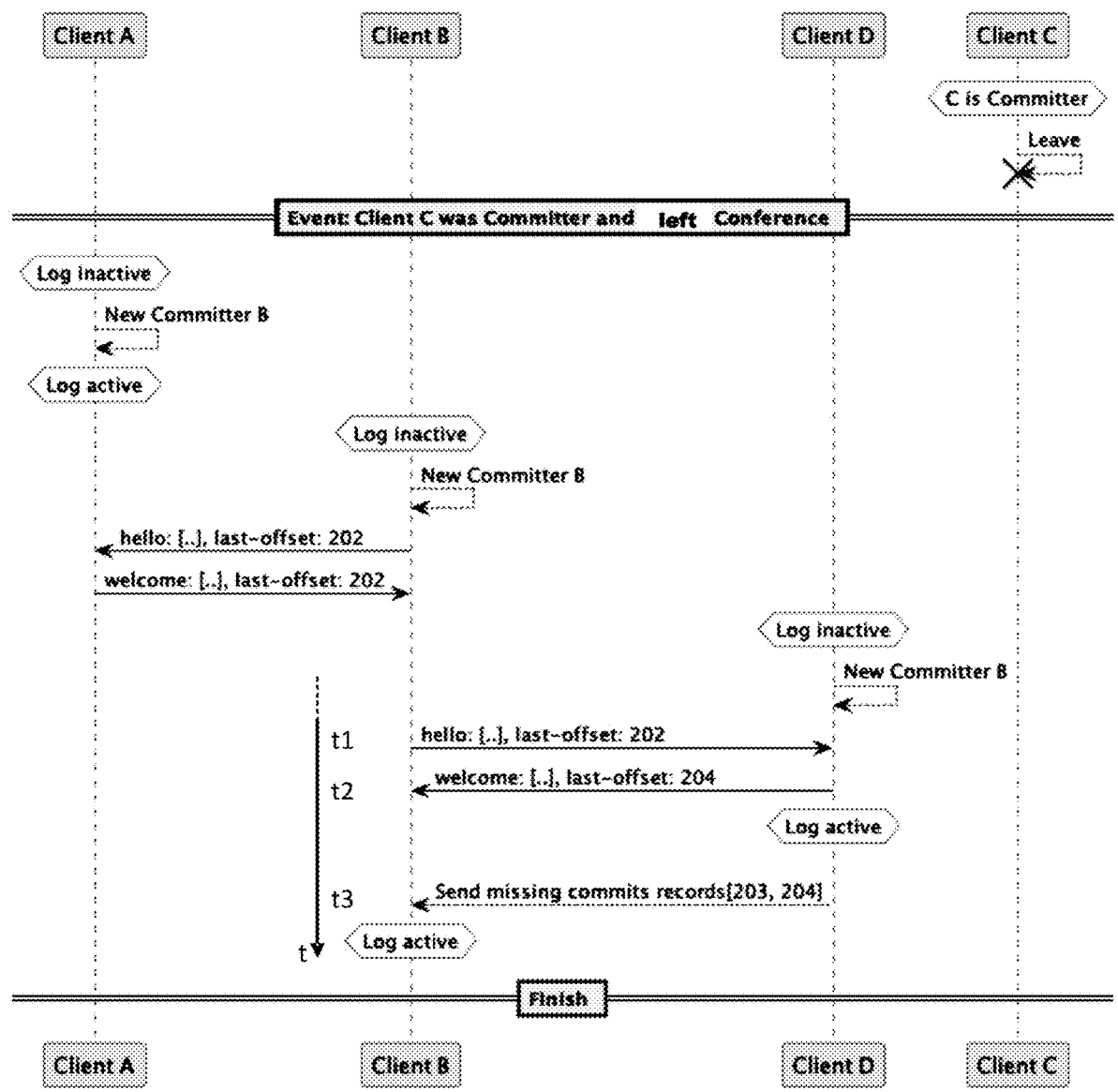
FIG. 6 illustrates yet another possible negotiation of the decision-maker.

FIG. 5 illustrates the case when there are more than two clients in the conference.

If there is already more than one client in the conference, here the clients A and B, the welcome handshake takes place between the new client and all existing clients, see times t1, t2 and t3, t4. This case is not significantly different from the previous case (cf. FIG. 4).

However, it may be the case that different clients have different commit statuses. This is because not all clients are notified about new clients at the same time. In this case, client B (the "old" active committer), at the time t2', "committed" another new entry sequentially numbered 201 before it is deactivated (time t2").

It should be noted that the new active committer of client C, before it is activated at the time t7, still synchronizes the last commit of client B. "Commit" is understood in particular to mean the writing of a new data record (preferably together with an addition that makes it possible to recognize the producing client and a sequence number of the data record) to the offset topic by the committer client and subsequent clearance or sending to the remote clients, cf. FIG. 3, thereby making the entry in question available to all clients, as explained above.

To this end, client B first sends, at the time t5, its entry numbered 201 to client C, the new committer, because it had indicated, by way of its "welcome" message (at the time t4), that its last entry had the number 200. At the time t6, the new committer client, client C, "committed" the entry 201 in question specifically to the client A, because, at the time t1, this had likewise indicated that its current offset was only at 200.

If, according to FIG. 6, a client (here client C) leaves the conference, only the case whereby the outgoing client was the active committer is actually of interest. In this case, the new committer has to perform another data synchronization, as already explained above with reference to FIG. 5. In this case, client D indicates, at the time t2, that it is at offset 204 and transmits, at the time t3, the entries still missing for offsets 203 and 204 to the new committer client, client B, which had indicated, at the time t1, that its offset was (only) at 202.

When a client leaves the conference, the remaining clients ascertain the new committer on the own and independently of one another, as explained. Nevertheless, the new committer preferably initiates a handshake with each other client. It does this in order to collect and distribute all commits that have already taken place, as just explained.

Figure 7:
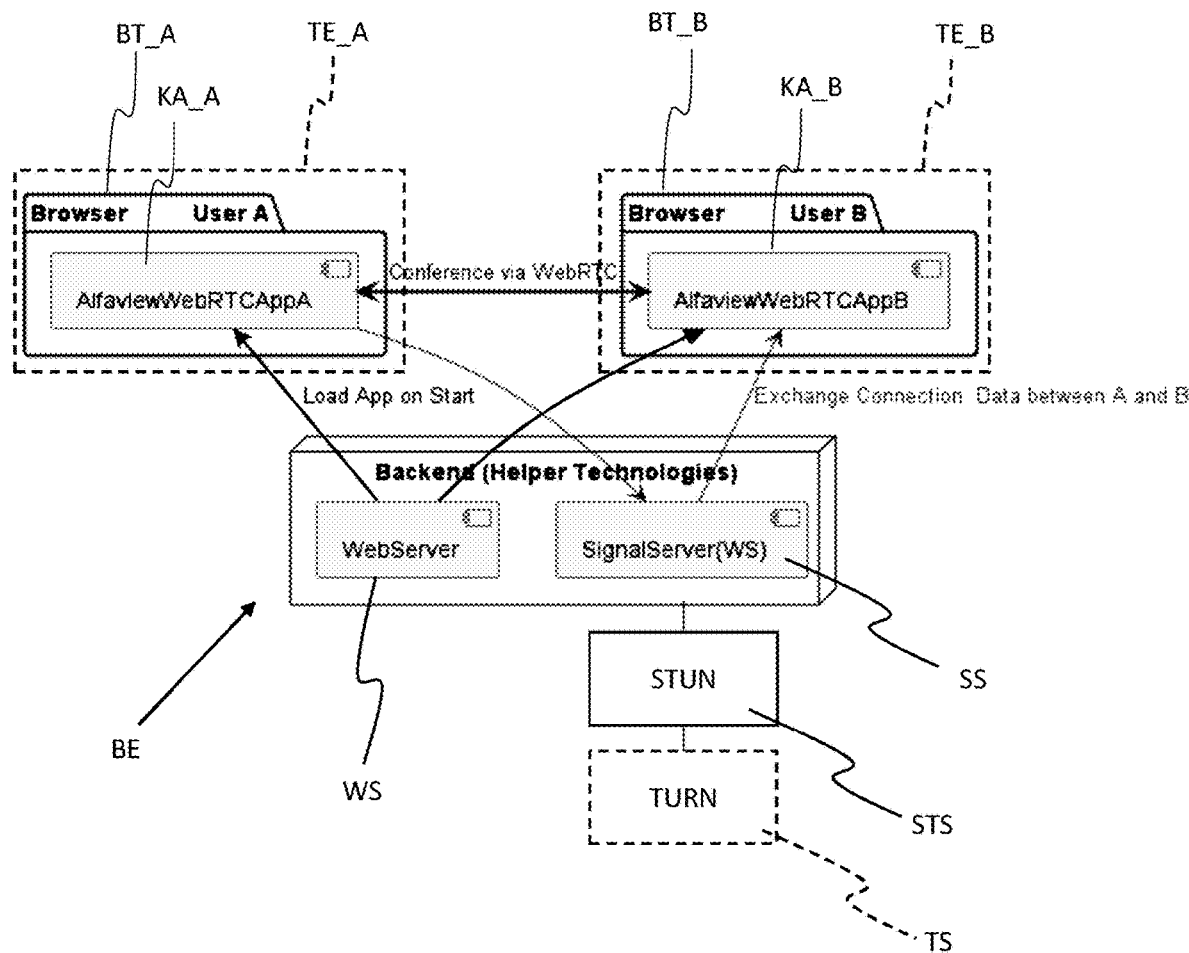
FIG. 7 shows one embodiment of the conferencing application according to the invention.

FIG. 7 shows one possible setup of the computer-based conferencing application according to the invention. This comprises (for each user or subscriber A, B, . . . ) a conferencing application KA_A, KA_B with a user interface, which conferencing application KA_A, KA_B is executed, or able to be executed, on each subscriber terminal TE_A, TE_B in a browser tab BT_A, BT_B in question. This conferencing application KA_A, KA_B is also referred to as "Alfaview WebRTC App" in FIG. 7; the addition "A", "B" refers to the user. The conferencing application furthermore comprises a main application (see FIG. 8) executed, or able to be executed, on each subscriber terminal, for connecting the respective conferencing application to the distributed database (see FIG. 8) explained further above, in particular for creating WebRTC data channels between the users. The database is thus also part of the conferencing application, cf. FIG. 8 further below. The users A, B confer via WebRTC (double-headed arrow "Conference via WebRTC" between the terminals TE_A and TE_B or the conferencing applications KA_A, KA_B).

Reference sign BE denotes what is known as the backend, which comprises helper technologies that may be very helpful in spite of decentralization.

Reference sign WS denotes a Web server. The Alfaview WebRTC app is what is known as a single-page Web app. When the corresponding URL is called in the browser, the app is loaded once and in full into the browser BT_A, BT_B from the Web server WS (arrows "Load App on Start"). No further Web server connection is necessary thereafter.

It should be noted here that what is known as a progressive Web app may easily be created from a single-page Web app in one corresponding development. A progressive Web app works like a desktop app or a mobile app. The app is then downloaded once to the desktop or mobile device and is then only updated regularly.

Reference sign SS denotes what is known as a signal server (WebSocket). An application executed in the browser does not have a publicly known IP address. It is anonymous and therefore undiscoverable. In order for two browser applications to be able to set up a server-free connection, they require an intermediary via which they are able to exchange connection data (arrow "Exchange Connection Data between A and B"). The underlying concept is called signaling. The signal server SS operates as such an intermediary.

Reference sign STS denotes what is known as a STUN server. This may be provided for the purpose of ascertaining connection addresses, in particular IP and/or port addresses of the users/subscribers, and/or for creating holes in any firewalls present at the subscribers.

Reference sign TS denotes an optional TURN server that is designed to intervene as an intermediary in order to transmit audio and video streams, preferably in encrypted form, if the technical requirements for a conference are not met. Most preferably, the communication with the TURN server is always end-to-end encrypted. The server (TURN server) is therefore not able to eavesdrop.

The technical requirements for a conference are not met in particular if a subscriber is sitting behind a strong firewall, because a peer-to-peer connection is then not possible. As a substitute, an attempt is then preferably made to set up a conventional client-server-client connection, wherein the server here is the TURN server. The client-server-client connection is generally tolerated by firewalls. This is a standard procedure in WebRTC.

FIG. 8 once again shows, with reference sign KA, the conferencing application from FIG. 7 with a user interface NO.

Figure 8:
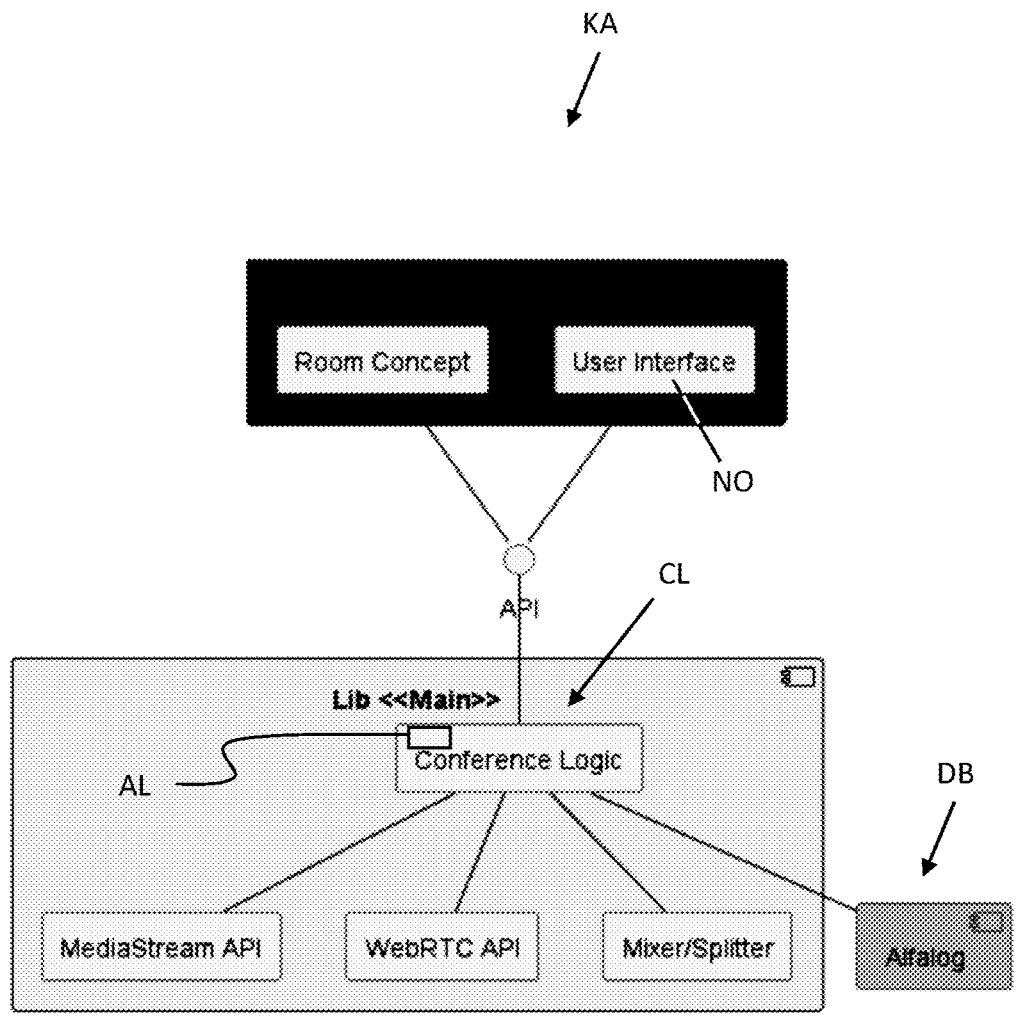
FIG. 8 shows a detail of the embodiment in FIG. 7.

The conferencing application or Web conferencing application ("Alfaview WebRTC App") KA is preferably written in typescript and comprises three essential components according to the exemplary embodiment in FIG. 8:

The application with the user interface NO. The user interface NO is separate from the actual conferencing app, that is to say in particular from the database ("AlfaLog"; see below). The user interface NO may therefore easily be swapped and changed. The software design may be such that the user interface NO is a component.

"Lib": The main logic or main application ("Conference Logic", CL) is located in "Lib". This is also where the connection to the WebRTC API and a MediaStream Browser API are located. Such APIs are issued by browser manufacturers and may be used by developers. WebRTC in particular is generally also designed in the form of an API in the browser. Said MediaStream Browser API makes it possible to turn on the laptop camera. Browsers have a large number of such APIs that are able to be accessed in "Lib". A person skilled in the art is aware of this per se. Other components, such as mixers and splitters, are also located here, as illustrated. This component may be used to mix videos (video and audio data) from different subscribers to form a media stream, which stream is split up again at the receiver.

AlfaLog: AlfaLog is the decentralized database DB according to the invention based on an append-only log, as described above (cf. FIG. 1). AlfaLog is required in order to distribute the current state of the conference or a cluster topology across all conference subscribers. AlfaLog is therefore the actual server replacement.

Preferably, the conferencing application KA comprises an algorithm AL, illustrated schematically, preferably in the main application CL, which is designed to decide which subscribers transmit video and/or audio streams to one another. To this end, each subscriber may be assigned a number, in particular starting at one and increasing, which numbers are preferably allocated on the basis of a chronological order in which a subscriber dials into the cluster, that is to say into the conference. In the conferencing application, it may be defined, or able to be defined, for each subscriber, the other subscriber to which a video/audio stream is to be opened, wherein the individual subscribers coordinate with one another via the data channels, preferably in accordance with the cluster topology known from the database DB.

In the Alfaview Web RTC app, when setting up the conference, a WebRTC data channel is preferably opened to each other subscriber in the conference. A WebRTC data channel involves few resources and is used to transmit (text) messages. Each subscriber may then send messages to each subscriber. A fully connected network N exists between the subscribers T1-T6 via the data channels, as illustrated schematically in FIG. 9.

Video and/or audio streams are able to be dynamically added to and/or removed from an existing data channel connection, in particular WebRTC connection, wherein each subscriber has a transmitting and a receiving transceiver, for which purpose the application, in particular the main application, is designed to open or to close the video and/or audio stream transceivers in question on both subscriber sides of the data channel in question when necessary.

Figure 9:
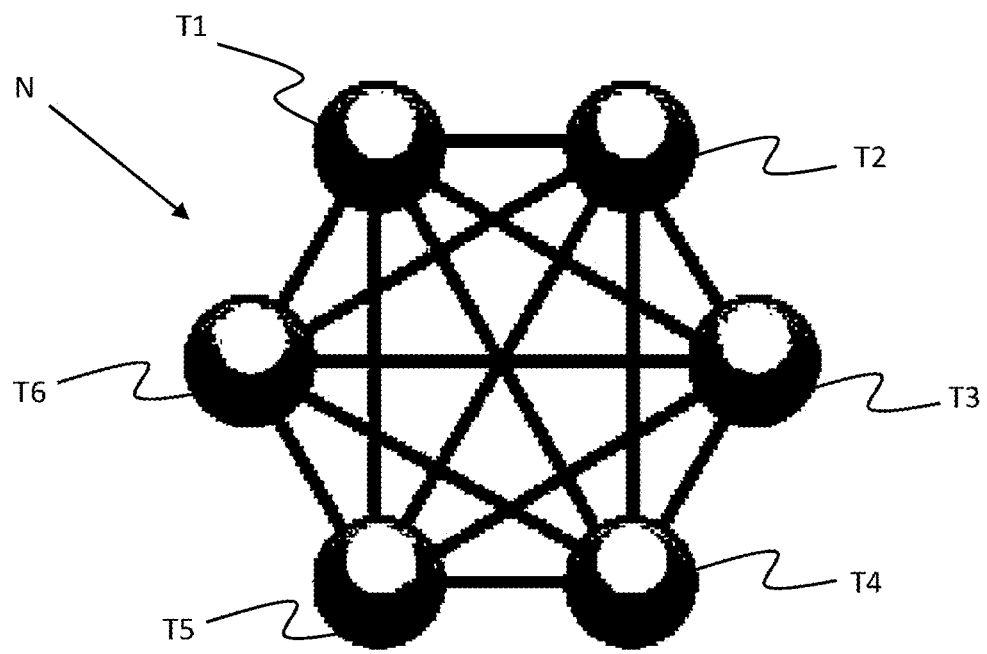
FIG. 9 shows a subscriber cluster.

However, the transmission of video and audio streams is highly resource-intensive. A fully connected network corresponding to FIG. 9 is not possible here. There is therefore a need for the already mentioned algorithm AL (FIG. 8), which decides which subscribers transmit video/audio streams to one another. For this purpose, each subscriber is preferably assigned a number, as has already been mentioned, starting at one and increasing. This is illustrated schematically in FIG. 10. The numbers are preferably allocated according to the chronological order in which a subscriber in question dials into the conference. The first subscriber in the conference thus receives the number one, and so on. Depending on their number, each subscriber is able to recognize the other subscriber to which an audio/video stream has to be opened. In this case, the individual subscribers may coordinate with one another via the existing data channels.

Alfalog may be used to assign a unique natural number to each subscriber, starting in particular at 1. By way of example, it may be defined that subscribers 1-3 share their videos and audio. And it may be defined that subscriber 4 is only allowed to watch. In addition, for example, subscriber 4 receives the video from subscriber 1. Subscriber 5 is also only allowed to watch and receives the video from subscriber 2, etc. The numbers may thus be used to define with whom a subscriber has to share their video and audio data in a given conference topology.

Figure 10:
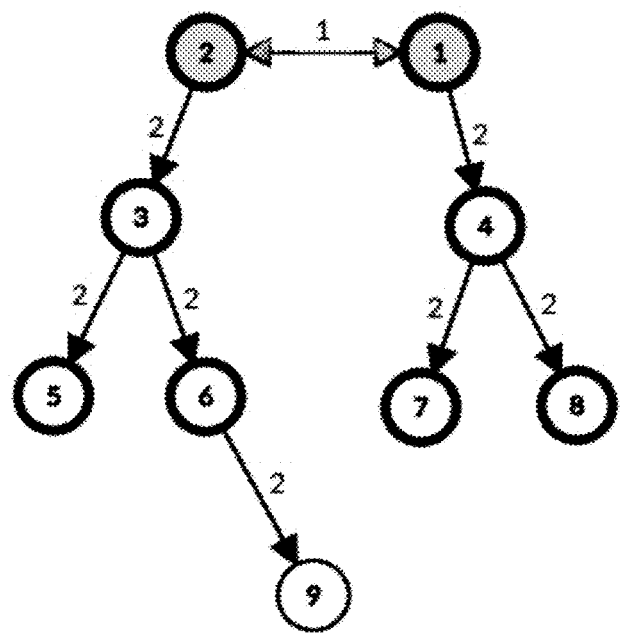
FIG. 10 shows the illustration of a cluster topology.

In FIG. 10, there are a total of nine subscribers (numbered accordingly). Subscribers 1 and 2 are what are known as VIP users (active subscribers that send and receive video/audio streams). The other seven subscribers numbered 3 to 7 are what are known as viewers as passive subscribers. Video and audio data are only sent from the VIPs to all subscribers. The VIPs1 and 2 mix all the videos that they receive (videos from 1 and 2) and send the resulting mixed stream (Media Stream) to their viewers (subscribers 3-7). Passive viewers are able to move to the foreground by pressing a button in the app (in particular via the user interface NO, FIG. 8) and (briefly) take over the role of an active VIP, which in turn becomes a passive viewer. The corresponding information is stored in the AlfaLog database and is therefore available to all subscribers.

This last aspect is the preferred main application case of AlfaLog. The numbers (see above) of the subscribers are stored in AlfaLog. Each subscriber then know its number and those of the other subscribers. AlfaLog is consistent without requiring a back-end server. Each client thus knows from whom they receive data, or from whom they do not receive data and to whom they have to send data, as already explained.

The connection between the VIPs is peer-to-peer in each case. The data from the VIPs are sent to the viewers in a bundle, as already mentioned above.

By way of example, it is assumed that subscribers 1, 2 and 3 are VIPs. Subscriber 1 then establishes a peer-to-peer connection to subscriber 2 and to subscriber 3. Subscriber 3 also establishes a peer-to-peer connection to subscriber 2, such that all three are connected to one another. Subscriber 1 then receives the video and audio data from subscriber 2 and subscriber 3. Subscriber 1 combines these data with its own data (video and audio) to form a data stream (Media Stream), and sends this to subscriber 4 (viewer). Subscriber 4 splits this one stream back into three video/audio data (streams) and displays them.

The present invention is thus advantageously able to solve the problem of dynamics (the speaker problem) in a temporally changeable subscriber cluster. Specifically, conferences are highly dynamic constructs in terms of time. If for example a viewer wants to become a VIP speaker, from a technical point of view, they only have to exchange their number with a VIP subscriber, cf. FIG. 10. However, this change has an impact on the neighboring subscribers. If for example number six swaps places with number two and becomes a VIP subscriber, other subscribers will also have to set up their video and audio streams again or close them. In the case under consideration, these are subscribers one, three and nine. Other subscribers are not affected.

The naïve approach of solving the problem simply by direct communication between the individual parties involved fails because of two things, namely, on the one hand, complexity, because the number of special cases far exceeds the number of specific use cases. On the other hand, but above all, the number of text messages that a subscriber receives when a new subscriber is added increases as the number of subscribers increases, to such an extent that the required processing becomes a problem within milliseconds and the receiving client collapses.

The problem described is able to be solved easily by using the decentralized database according to the invention. In the example case, the viewer with the number six writes the new number two and the new number six for the previous number two to its data sink (raw topic) only for itself. All clients receive this data record, as was explained in detail above, through the commit process, and are then able to respond thereto in order to adjust the conference accordingly without having to enter into direct consultation with the other clients for this purpose.

Finally, it should be emphasized that the described application to conferences constitutes only a preferred application case. In principle, the invention is not limited to such a use of the described database.

The invention claimed is:

1. A system for operating a decentralized database (DB), the system comprising:
a plurality of subscriber terminals each comprising a processor in communication with a memory to execute the database (DB), said database comprises:
a plurality of individual subscriber databases containing respective data records (1, 2, 3, ... ), said data records (1, 2, 3, ... ) are synchronized with one another, or able to be synchronized with one another, via data channels, in which the subscribers (T1-T6) are grouped together to form a dynamically changeable cluster;
one of the subscribers (T1-T6) in the cluster is selected, or selectable, as decision-maker (C);
each of the subscribers (T1-T6) is configured to locally produce entries in a subscriber data collection structure (RT) and to transmit said entries at least to the decision-maker (C) for clearance, wherein the individual subscriber data collection structures (RT) comprise storage media that are only able to be written to and that cannot be erased;
the decision-maker (C) is configured to successively arrange and clear its own entries and the entries received from the other subscribers in the decisionmaker's subscriber database (OT) forming cleared entries; and
the other subscribers (T1-T6) are designed to copy the cleared entries, in accordance with an arrangement of the cleared entries in the subscriber database (OT) of the decision-maker (C), to respective own subscriber databases of the other subscribers after the clearance has taken place.

2. The system as claimed in claim 1, wherein each change of the cluster is connected with a new selection of the decision-maker (C).

3. The system as claimed in claim 1, wherein each individual one of the subscribers (T1-T6) has a unique identification (UUID) and is configured to communicate said unique identification (UUID) to the other subscribers (T1-T6) in the cluster, wherein each of the individual subscribers (T1-T6) is configured to unambiguously determine the decision-maker (C) based on the identifications (UUID) communicated thereto, by arranging the identifications (UUID) in an unambiguous order and selecting one of the subscribers (T1-T6) with a predetermined placement within this order as decision-maker (C).

4. The system as claimed in claim 1, wherein at least one of the subscriber databases (OT) or the subscriber data collection structures (RT) are stored exclusively locally on the respective subscriber terminal (TE_A, TE_B).

5. The system as claimed in claim 1, wherein the individual subscriber databases (OT) are connected to one another via WebRTC data channels.

6. The system as claimed in claim 1, wherein each of the entries comprises at least one addition by which said entry is unambiguously identifiable with regard to the subscriber (T1-T6) producing the entry and a temporal position of production.

7. The system as claimed in claim 1, wherein at least a number of the subscribers (T1-T6) are configured to continuously monitor the entries copied to the respective subscriber database (OT) and to transmit one said entry of said subscriber not contained there again to the decision-maker (C) for clearance.

8. The system as claimed in claim 3, wherein the subscribers (T1-T6) are configured to transmit or display, together with or in addition to the unique identification, a state of said respective subscriber database (OT); and a newly ascertained said decision-maker (C) is configured to first ensure that all of the subscriber databases (OT) have a same state, by transmitting the entries cleared by a previous said decision-maker (C) to the individual subscriber databases (OT), before the newly ascertained decision-maker (C) produces further ones of the clearances.

9. The system as claimed in claim 1, wherein the entries contain information about a topology of the cluster.

10. A computer-based conferencing arrangement, comprising:
the system as claimed in claim 1;
a conferencing application (KA) with a user interface (NO), said conferencing application (KA) is executed, or executable, on each said subscriber terminal (TE_A, TE_B);
a main application (CL) executed, or executable, on each said subscriber terminal (TE_A, TE_B), for connecting the respective conferencing application (KA) to the distributed database (DB).

11. The conferencing arrangement as claimed in claim 10, further comprising:
at least one of the following for setting up the cluster or for updating the cluster in an event of terminations:
a) a STUN server (STS) for at least one of ascertaining connection addresses of the subscribers (T1-T6), or for creating holes in firewalls present at the subscribers (T1-T6);
b) a signal server (SS) for sending connection data to subscribers (T1-T6) of the cluster;
c) a TURN server (TS) configured to intervene as an intermediary in order to transmit audio and video streams, if technical requirements for a conference are not met.

12. The conferencing arrangement as claimed in claim 10, further comprising:
an algorithm (AL) which is configured to decide which of the subscribers (T1-T6) transmit video and/or audio streams to one another, for which purpose each of the subscribers (T1-T6) is assigned a number, said numbers are allocated based on a chronological order in which each said subscriber (T1-T6) dials into the cluster, wherein, in the conferencing application for each of the subscribers (T1-T6), to define the other subscriber (T1-T6) to which a video/audio stream is to be opened, the individual subscribers (T1-T6) coordinate with one another via the data channels in accordance with a known cluster topology.

13. The conferencing arrangement as claimed in claim 10, wherein video and/or audio streams are able to be dynamically added to and/or removed from an existing data channel connection, each of the subscribers (T1-T6) has a transmitting and a receiving transceiver, for which purpose the application (KA) is configured to open or to close the video and/or audio stream transceivers in question on both subscriber sides of the data channel in question.

14. A method for maintaining a decentralized database (DB) distributed among a plurality of subscriber terminals, said database is formed from a plurality of individual subscriber databases (OT) containing respective data records (1, 2, 3, ... ), said data records (1, 2, 3, ... ) are synchronized with one another, or are synchronizable with one another, via data channels, in which subscribers (T1-T6)

are grouped together to form a dynamically changeable cluster, the method comprising:
  selecting one of the subscribers (T1-T6) in the cluster as decision-maker (C);
  each of the subscribers (T1-T6) locally producing entries in a subscriber data collection structure (RT) and transmitting said entries at least to the decision-maker (C) for clearance, wherein the individual subscribers (T1-T6) each store the entries for said individual subscriber in subscriber data collection structures (RT) that comprise storage media that are only able to be written to and that cannot be erased;
  the decision-maker (C) successively arranging and then clearing said decision-maker's own entries and the entries received from the other subscribers (T1-T6) in the decision-maker's subscriber database (OT); and
  the other subscribers (T1-T6) adopting the cleared entries, in accordance with an arrangement of the cleared entries in the subscriber database (OT) of the decision-maker (C), into the respective subscriber databases (OT).

15. The method as claimed in claim 14, further comprising selecting a new decision-maker (C) after each change of the cluster.

16. The method as claimed in claim 14, wherein each individual one of the subscribers (T1-T6) has a unique identification (UUID) and communicates said unique identification to the other subscribers (T1-T6) in the cluster, and each of the individual subscribers (T1-T6) unambiguously determines the decision-maker (C) based on the identifications (UUID) communicated thereto.

17. The method as claimed in in claim 14, wherein, the subscriber databases (OT) and/or subscriber data collection structures (RT) are stored exclusively locally on the respective subscriber terminal (TE_A, TE_B).

18. The method as claimed in claim 14, wherein the individual subscriber databases (OT) are connected to one another via WebRTC data channels.

19. The method as claimed in claim 14, wherein at least a number of the subscribers (T1-T6) continuously monitor the entries copied to the respective subscriber database (OT) and transmit one said entry of their own not contained there again to the decision-maker (C) for clearance.

20. The method as claimed in claim 16, wherein the subscribers (T1-T6) transmit or display, together with or in addition to the unique identification (UUID), a state of the respective subscriber database (OT), and a newly ascertained said decision-maker (C) first ensures that all of the subscriber databases (OT) have a same state, by transmitting the entries already cleared by a previous said decision-maker (C) to the individual subscriber databases (OT), before the newly ascertained decision-maker (C) produces further clearances.

21. A method for conducting a computer-based conference, comprising:
  maintaining a decentralized database (DB) as claimed in claim 14;
  providing and executing a conferencing application (KA) with a user interface (NO) on each of the subscriber terminals (TE_A, TE_B);
  connecting the respective conferencing application (KA) to the distributed database (DB) by executing a main application (CL) on each said subscriber terminal (TE_A, TE_B).

22. The method as claimed in claim 21, further comprising: setting up the cluster or updating the cluster in an event of terminations, by using
  a) a STUN server (STS) for ascertaining connection addresses of the subscribers (T1-T6), and/or for creating holes in firewalls present at the subscribers (T1-T6);
  b) a signal server (SS) for sending connection data to the subscribers (T1-T6) of the cluster; and
  c) a TURN server (TS) as an intermediary to transmit audio and video streams if the technical requirements for a conference are not met.

23. The method as claimed in claim 22, further comprising deciding which of the subscribers (T1-T6) transmit video and/or audio streams to one another, by virtue of each of the subscribers (T1-T6) being assigned a number, wherein each of the subscribers is able define the other subscriber (T1-T6) to which a video/audio stream is to be opened, and the individual subscribers (T1-T6) coordinate with one another via data channels in accordance with a known cluster topology.

24. The method as claimed in claim 22, wherein video and/or audio streams are dynamically added to and/or removed from an existing data channel connection, and each of the subscribers (T1-T6) has a transmitting and a receiving transceiver, for which purpose the respective video and/or audio stream transceivers are opened or closed on both subscriber sides of the data channel.

* * * * *